United States Patent [19]

Papak

[11] Patent Number: 4,982,701
[45] Date of Patent: Jan. 8, 1991

[54] ANIMAL TETHERING DEVICE

[76] Inventor: Don J. Papak, 3478 Woodland, Windsor, Ontario, Canada, N9E 1Z7

[21] Appl. No.: 424,866

[22] Filed: Oct. 20, 1989

[51] Int. Cl.$^5$ ............................................. A01K 3/00
[52] U.S. Cl. ................................... 119/121; 248/156
[58] Field of Search ............... 119/117, 121, 122, 123; 52/155, 156, 157, 165; 248/156

[56] References Cited

U.S. PATENT DOCUMENTS

| | | | |
|---|---|---|---|
| 762,645 | 6/1904 | May | 52/156 |
| 1,699,308 | 1/1929 | Postings | 119/117 X |
| 2,746,208 | 5/1956 | Lewis | 248/156 X |
| 3,189,004 | 6/1965 | Sinclair | 119/124 |
| 3,658,037 | 4/1972 | Hunter | 119/117 X |
| 3,894,589 | 7/1975 | Ciraud | 52/165 X |
| 4,060,244 | 11/1977 | Graham | 119/124 |
| 4,334,503 | 6/1982 | Casey, Jr. | 119/121 |

FOREIGN PATENT DOCUMENTS 0024220 of 1905 United Kingdom ............... 119/122

OTHER PUBLICATIONS

"Tangleproof Dog Tether . . . ", *Popular Mechanics*, May 1955, p. 166.

*Primary Examiner*—Robert P. Swiatek
*Assistant Examiner*—Todd E. Manahan
*Attorney, Agent, or Firm*—Allen D. Gutchess, Jr.

[57] ABSTRACT

An animal restraint device is disclosed. It includes a tubular member which is placed in the ground in a more-or-less permanent position. Two or more of these members can be located in desirable positions around a yarn. A restraint stake to which a flexible line can be connected is placed in the tubular member to tie an animal. The tubular member has an upper collar extending outwardly from an upper end portion for visibility when the member is inserted in the ground. The upper extremity of the tubular member extends slightly above the collar. The stake has an upper ring for making a connection with a flexible line and has a rain cap below the ring which is received over the upper extremity of the tubular member and substantially prevents entry of water thereinto. A plastic cap can be placed over the upper end of the tubular member when the stake is not in place.

8 Claims, 1 Drawing Sheet

U.S. Patent　　　Jan. 8, 1991　　　4,982,701
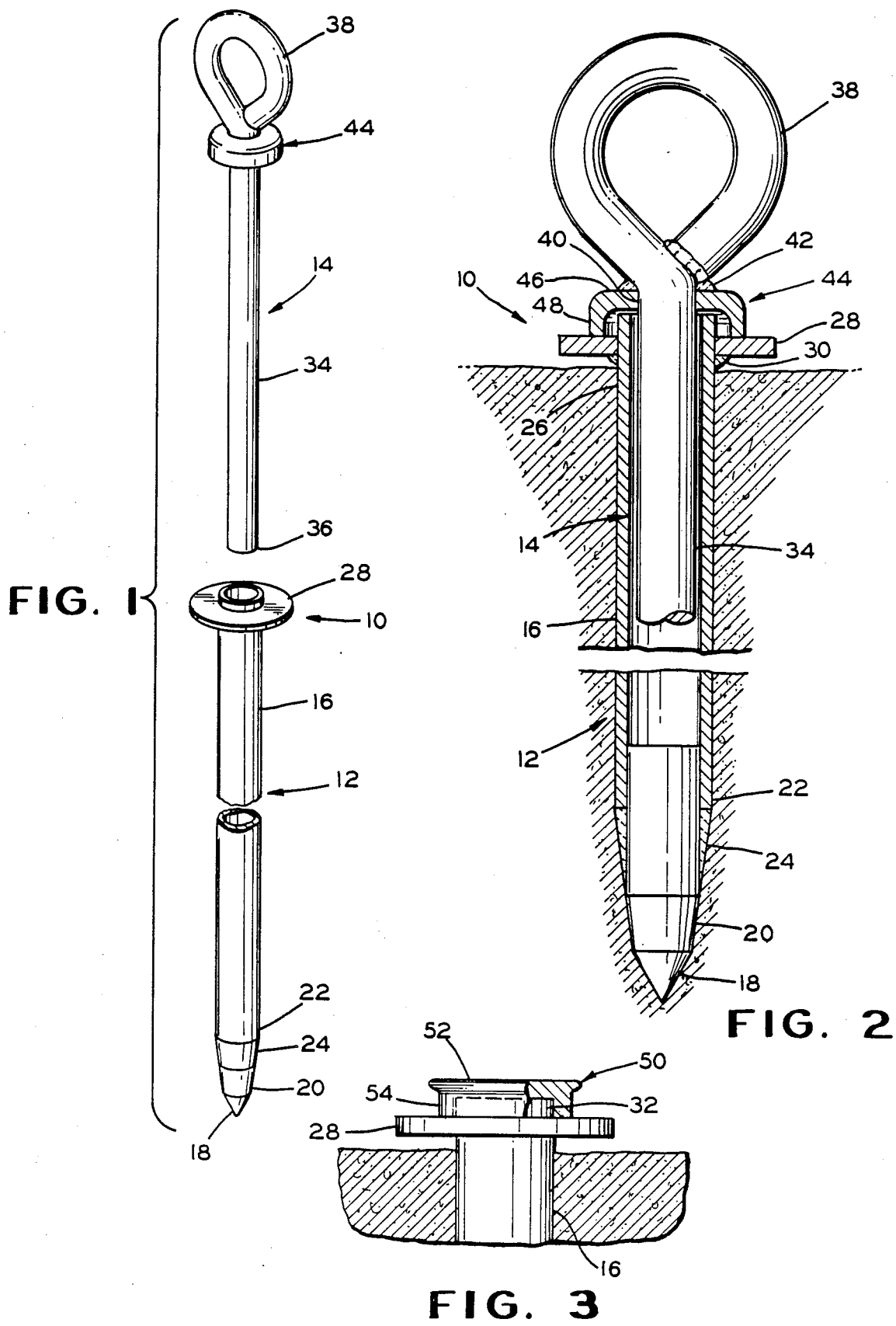

ANIMAL TETHERING DEVICE

This invention relates to an animal restraint of a water-resistant design.

The animal tethering device in accordance with the invention includes a tubular metal member having a tapered or pointed end which is driven into the ground substantially to an upper collar on the member which is affixed to an upper end portion thereof. The collar is employed primarily for visibility to enable one to readily locate the member and it also can serve as a stop to prevent the member from being driven too far into the ground and making it difficult to remove. However, the collar is preferably slightly above ground level when the tubular member is in place. The upper extremity of the tubular member projects slightly above the flange, forming an upper, annular edge. Two or more of the tubular members can be located in desirable positions around a yard where an animal can be tied. The animal can then be treated to more than one area when it is tied up and wear and tear on the grass can be more widely distributed.

A restraint stake or rod with an upper ring to which a flexible line is connected, with the animal attached to the other end, is placed in the tubular member and anchors the line without additional steps being required. The stake has a rain cap at the upper end, below the ring, which extends outwardly with a downwardly-extending annular flange. The diameter of the flange exceeds the diameter of the tubular member so that the cap is received over the upper extremity of the tubular member when in place in the member. The cooperation of the tubular member and the annular flange thereby substantially prevents entry of debris, dirt, and water into the tubular member. This prevents the stake from binding, especially if water in the tubular member would freeze. It also prolongs the life of the member, if made of a material which may rust. The stake can also relatively easily rotate in the tubular member, with the rain cap flange riding on the upper surface of the collar of the member or on the upper end of the tubular member, to minimize the chance that the flexible line will become entangled with the stake.

The animal tethering device also includes a cap of plastic or other suitable resilient material which can be placed over the upper extremity of the tubular member when the stake is not in position, to keep out water.

An animal tether employing a female and a male member is shown in U.S. Pat. No. 3,658,037, issued Apr. 25, 1972. However, with that tether, water can readily enter the female component to cause deterioration of same. Further, a ring at the top of the male member rides on the upper edge of the female member and would resist rotatable movement of the male member.

It is, therefore, a principal object of the invention to provide an animal tether of water-resistant design.

Another object of the invention is to provide an animal tether which includes a tubular member and a stake inserted therein which has a rain cap to resist entry of water into the tubular member.

Other objects and advantages of the invention will be apparent from the following detailed description of a preferred embodiment thereof, reference being made to the accompanying drawings, in which:

FIG. 1 is an exploded, fragmentary view in perspective of an animal tether in accordance with the invention;

FIG. 2 is an enlarged, fragmentary view in vertical cross section of the animal tether of FIG. 1, shown in assembled relationship and in position in the ground; and FIG. 3 is a somewhat schematic view of part of the animal tether with a cap placed over the upper end thereof.

Referring to the drawings, an animal tether embodying the invention is indicated at 10 and included a female component or tubular member 12 and a male component or stake 14. The tubular member 12 includes a metal or plastic tube 16 having a tapered or pointed end 18 formed by a pointed metal body 20 which can be affixed to a lower end 22 of the tubular member 12 by weld metal 24 or adhesive. The body 20 provides a damage-resistant lower end when the tubular member 12 is driven into the ground. An upper end portion 26 has an outwardly-extending annular collar or flange 28 which is affixed to the end portion 26 by weld metal 30 or other suitable means. An upper extremity 32 of the tubular member projects above the flange 28 and provides an upper annular edge for the tubular member.

The restraint stake 14 includes a long metal rod 34 which is smaller in diameter than the tube 16 and is shorter than the tube. This is a solid metal rod which has a lower, blunt end 36, with an upper ring 38 extending upwardly from an upper end 40. The ring is attached to an end of a suitable flexible line, in the form of a chain, cable, rope or the like, by a snap hook or other suitable means, as is well known in the art. The animal is suitably attached to the other end of that line. Weld metal 42 or other suitable means affixes a rain cap 44 to the upper end 40 of the rod 34. The rain cap 44 includes an outwardly-extending, annular portion 46 terminating in a downwardly-extending, annular flange or lip 48, the inner diameter of which exceeds the outer diameter of the tubular member 12.

When the stake 14 is in position, the annular flange 48 is deep enough so that the lower edge thereof preferably rests directly on the upper surface of the collar 28, with the annular portion 46 of the rain cap being slightly above the upper extremity 32 of the tubular member 12. This provides a reasonably tight seal to restrict the seepage of water under the rain cap 44 and into the upper extremity 32 of the tube, even in a driving rain. However, the rain cap 44 can be supported on the upper end of the tubular member 12. Further, the rain cap 44 provides a positive stop for the stake 14 and enables the stake 14 to rotate more easily relative to the tubular member 12, with the flange 48 riding on the collar 28 or the cap riding on the upper end of the tubular member 12 as the stake 14 turns. This minimizes the chance for the flexible line to become entangled with the stake ring.

When the tubular member is driven into the ground, it preferably is positioned so that the collar 28 is slightly above the surface of the ground yet not high enough to allow the upper extremity 32 to interfere with the blade of a mower. The slightly raised position of the collar 28 also enhances visibility of the tubular member and decreases the possibility of ground water seeping over the tubular extremity 32 and into the interior of the tubular member 12. With the elevated position of the collar 28, a suitable tool can also be more readily placed under the collar to raise the tubular member 12 from the ground from time-to-time to install it in a new location.

When it is desired to tie the animal at a different location where another one of the tubular members 12 is located, it is simple to accomplish this. The stake 14 is lifted out of the tube 16 by the ring 38 and simply inserted in the other tubular member without the need for untying the flexible line from either the stake 14 or the animal.

When the stake 14 is removed from the tubular member so that the upper end is open, a suitable cap 50, preferably of slightly resilient material such as plastic or rubber, is placed over the upper extremity 32 of the tube 16 and snugly held by a friction fit. The cap 50 includes a circular top 52 and an annular flange 54, the inner diameter of which is preferably slightly less than the outer diameter of the extremity 32 to provide the secure fit thereon.

In one preferred form of the invention, by way of illustration, the tube 16, including the metal tip 20, has an overall length of nineteen inches, with the tube 16 having an inner diameter of nine-sixteenths inch and an outer diameter of thirteen-sixteenths inch. The rod 34 of the stake 14 has an overall length of eight and one-quarter inch and a diameter of one-half inch. The extremity 32 of the tube 16 extends one-quarter inch above the upper surface of the collar 28. The rod 34 should have a length of approximately at least one-half of the length of the tube 16, not counting the tip 20, so that the stake 14 cannot be pulled out of the tubular member by the restrained animal. In any event, the length of the rod should be less than the length of the tube.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. An animal tethering device comprising a tubular member having a pointed end, said tubular member having an annular collar affixed at an upper end portion thereof; an elongate, rod-like member of a size to fit within said tubular member and having a length less than the length of said tubular member; a rain cap affixed to an upper end portion of said rod-like member, said cap having an annular portion extending outwardly around said rod-like member and having a downwardly-extending flange at its outer edge, said flange having a diameter exceeding the outer diameter of said tube, the diameter of said flange not exceeding the diameter of an outer edge of said annular collar; and said rod-like member having ring means extending above the upper end thereof and above said cap to receive an end of a flexible member for restraining an animal.

2. An animal tethering device according to claim 1 wherein said tubular member has an upper end extremity projecting above said annular collar.

3. An animal tethering device according to claim 2 wherein the height of said downwardly-extending flange exceeds the distance which the extremity of said tubular member extends above said collar, whereby a lower edge of said flange contacts the upper surface of said collar when said rod-like member is in place in said tubular member.

4. An animal tethering device according to claim 2 wherein said device further comprises a separate cap of resilient material of a size to fit over the upper extremity of said tubular member after said rod-like member is removed from said tubular member.

5. An animal tethering device for tethering an animal in a given area about a central point in the ground, said device comprising a tubular member having a pointed end, said tubular member having an annular collar affixed at an upper end portion thereof and extending outwardly therefrom, said collar being spaced slightly above the ground, an upper extremity of said tubular member extending above said collar; an elongate, rod-like member having a diameter smaller than the inner diameter of said tubular member and having a length not substantially less than one-half the length of said tubular member; a ring affixed to the upper end of said rod-like member for receiving an end of a flexible line; a cap affixed to an upper end portion of said rod-like member below said ring, said cap having an annular portion extending outwardly from said rod-like member and having a downwardly-extending flange at its outer edge, said flange having a diameter exceeding the outer diameter of said tubular member, but not exceeding the diameter of said collar.

6. An animal tethering device according to claim 5 wherein the depth of said cap exceeds the distance which said tubular member extremity extends above said collar.

7. An animal tethering device according to claim 5 wherein the lower edge of said downwardly-extending flange engages the upper surface of said collar when said rod-like member is fully inserted in said tubular member.

8. An animal tethering device according to claim 5 wherein said device further comprises a separate cap of resilient material of a size to fit over the upper extremity of said tubular member after said rod-like member is removed therefrom.

* * * * *